Figure 1:
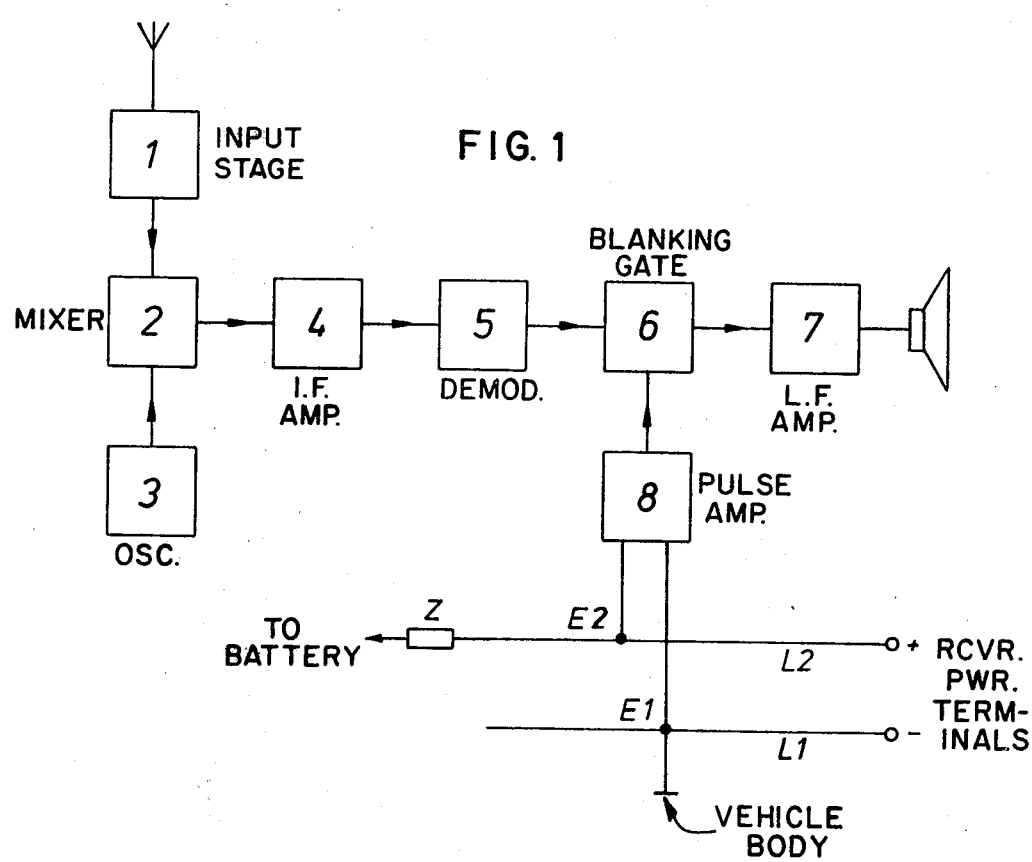

United States Patent

Rasehorn et al.

[11] 3,995,219
[45] Nov. 30, 1976

[54] INTERFERENCE SUPPRESSION CIRCUIT FOR AUTOMOBILE RADIO RECEIVERS

[75] Inventors: Hans Rasehorn; Jens Hansen, both of Hildesheim, Germany

[73] Assignee: Blaupunkt-Werke GmbH, Hildesheim, Germany

[22] Filed: July 9, 1975

[21] Appl. No.: 594,239

[30] Foreign Application Priority Data

May 9, 1975  Germany............................ 2520707

[52] U.S. Cl. .................................. 325/313; 325/478
[51] Int. Cl.² ...................... H04B 1/10; H04B 15/00
[58] Field of Search ............. 325/313, 323, 473, 478

[56] References Cited
UNITED STATES PATENTS

| | | |
|---|---|---|
| 2,136,659 | 11/1938 | Wood .................................. 325/313 |
| 2,549,671 | 4/1951 | Dana .................................... 325/313 |
| 3,137,817 | 6/1964 | Sheffet ................................. 325/473 |
| 3,569,840 | 3/1971 | Tanaka ................................. 325/473 |

*Primary Examiner*—Thomas B. Habecker
*Attorney, Agent, or Firm*—William R. Woodward

[57] ABSTRACT

A pulse amplifier with its input across the power supply leads to an automobile radio receiver to be protected against pulse interference is used to operate a blanking gate interposed between the demodulator of the receiver and the low-frequency circuits thereof. One of the power supply leads is grounded to the vehicle body. A resistor in the ungrounded lead increases the sensitivity of the pulse interference suppression circuit without impairing receiver operation. The circuit provides interference suppression that is not dependent upon the receiver band width and therefore usable both for AM reception and for FM reception.

5 Claims, 3 Drawing Figures

U.S. Patent  Nov. 30, 1976  3,995,219

INTERFERENCE SUPPRESSION CIRCUIT FOR AUTOMOBILE RADIO RECEIVERS

This invention relates to a circuit for suppressing interference pulses in an automobile radio receiver of the kind including a disturbance voltage detector which provides a blocking pulse to a gate circuit interposed in the low-frequency signal path of the radio receiver.

Such circuits are used to prevent interfering pulses that are found in the demodulator output from reaching the low-frequency stages of the receiver.

It is known to block momentarily a gate circuit interposed in the low-frequency signal path in response to a disturbance pulse taken from the output of an FM demodulator supplied to a disturbance pulse detector. During the blocking interval, better known as the blanking interval, only the value of the low-frequency signal that existed shortly before the appearance of the disturbance is supplied to the low-frequency amplifier, this being done by means of a storage capacitor provided on the output side of the gate circuit. In order that the rapidly rising leading edge of the disturbance pulse as well as the rest of the pulse should not fail to be suppressed, the low-frequency signal is supplied to the gate circuit through a delay line. Circuits in which the disturbance signal is taken from the demodulator output, however, are not suitable for the suppression of disturbances in AM reception. On account of the narrow band nature of the AM receiver components, recognition of disturbing signals in portions of the receiver following the demolulator are not practical. The disturbance pulses must in such cases be obtained for control purposes from the high-frequency portion of the receiver. If an already existing automobile radio receiver is to be equipped ("retrofitted") with a circuit for interference suppression, it is desirable to provide the remedial circuit in a separate casing and to connect it with the receiver by a cable. It is, however, very expensive to make such a connection by branching or cutting into a high-frequency lead of the receiver.

It is an object of the present invention to provide a circuit for suppressing disturbance pulses by which disturbance pulses can be eliminated at small expense while largely avoiding the disadvantages of known interference elimination circuits.

SUBJECT MATTER OF THE PRESENT INVENTION

Briefly, a pulse amplifier having two input terminals is utilized as the disturbance voltage detector of an interference suppression circuit of a radio receiver, one of these input terminals being connected to a conductor grounded to the metallic structure of the vehicle body and the second of these input terminals being connected to another conductor which is connected to the ungrounded terminal of the vehicle battery through an impedance having a d.c. resistance such as to reduce the voltage supply to the radio receiver only slightly; that is, by not more than one volt. Since one terminal of the vehicle battery is in practice grounded to the vehicle body, it is particularly convenient to make these input connections respectively to the negative and positive voltage supply lines used to energize the radio receiver.

The advantages obtained by the present invention are particularly that the suppression of disturbances is done in a manner independent of the band width of the receiver and that it is accordingly effective both for AM reception and for FM reception and, further, that the invention can be applied to an existing receiver without difficulty by the provision in accordance with the invention of an auxiliary device that is easily connectable to the receiver.

The invention is further described by way of an illustrative example with reference to the accompanying drawing, the FIG. 1 of which is a diagram, mostly in block form, of the circuit of a receiver to which the invention is applied.

Figure 2:
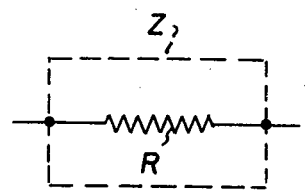
Figure 3:
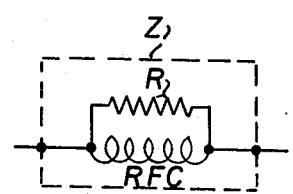

FIGS. 2 and 3 are diagrams of alternatives for the impedance Z of FIG. 1.

As shown in the drawing, an automobile radio broadcast receiver having an input stage 1, a mixer stage 2, an oscillator 3, an intermediate amplifier 4 and a demodulator 5, the latter being connected through a gate circuit 6 with a low-frequency amplifier 7, is provided with a pulse amplifier 8 having first and second input terminals designated $E^1$ and $E^2$ respectively and having its output connected to control the gate circuit 6. The first input terminal $E^1$ of the pulse amplifier 8 is connected to the grounded negative voltage lead $L^1$ of the receiver current supply, while the second input terminal $E^2$, on the other hand, is connected to the positive voltage lead $L^2$ of the receiver current supply.

If the radio receiver as shown is operated in a motor vehicle and exposed to the disturbance pulses commonly present in such an environment, these pulses, as is known, are picked up by the receiving antenna and enter into the receiver. Even the vehicle body operates as a receiving antenna for disturbance pulses. Since the negative voltage supply bus $L^1$, as already mentioned, is grounded, which means, of course, to the metallic vehicle body structure, it is at the same potential as the vehicle body. A disturbance pulse signal is available during disturbance between the vehicle body structure and a conductor that, with reference to the vehicle body, is at a different potential. In other words, conductors at a potential other than that of the relatively massive structure of the vehicle body will pick up transient voltages with reference to the vehicle body potential from disturbing electric fields in the neighborhood of the vehicle, particularly if there is substantial impedance between the conductor in question and the vehicle body, which may be expected to be the case if there is normally a potential difference. This disturbance pulse signal appears between the input terminals $E^1$ and $E^2$ of the pulse amplifier 8 when they are connected as above described, so that the pulse amplifier can then control the gate circuit 6 in such a way as to interrupt the low-frequency signal path of the receiver for an interval in which the disturbing pulse is present, so that no disturbing pulse can proceed from the demodulator to the low-frequency amplifier. The impedance between the ungrounded conductor to which the input terminal $E^2$ is connected and the vehicle body to which the other conductor and the other terminal $E^1$ are grounded can be increased by the interposition of an impedance Z, which may be a resistor, as shown in FIG. 2, or a resistor shunted by a radio frequency choke, as shown in FIG. 2, the like, in the ungrounded conductor between the voltage source and the portion of the conductor which is connected to the radio receiver and to the input of the pulse amplifier. Since a modern transistorized radio receiver uses very little current, such a resistor need not dissipate very much power, provided that the current for lighting circuits and the like is not required to pass through it. The impedance increase results in reinforcement of the detected pulse amplitude without introducing transient voltages into the receiver power supply of sufficient magnitude to impair receiver performance. The impedance Z should have a d.c. resistance low enough so that the receiver supply voltage is not significantly lowered: a voltage drop of a volt or so is tolerable in vehicular service, since the battery is usually being charged when the receiver is in use.

We claim:

1. Interference pulse suppression circuit for a vehicular radio receiver, comprising:
    pulse amplifier means (8) having two input terminals, of which one is connected to a conductor that is connected to and is at the potential of the metallic structure of a vehicle body, within which a radio receiver protected by said circuit is located, the second of said input terminals being connected to a voltage supply conductor energized by an ungrounded voltage supply terminal of a battery that is grounded to said vehicle body at another terminal of said battery, said voltage supply conductor being connected to said ungrounded terminal through an interposed circuit component the impedance of which is not capable of reducing the voltage supply of said receiver by more than one volt during normal operation thereof, whereby the pulse voltage pick-up sensitivity of said pulse amplifier means is increased without substantial impairment of the operation of said radio receiver.

2. Circuit as defined in claim 1, in which said first-mentioned input terminal (E1) of said pulse amplifier means (8) is connected to the negative voltage supply line (L1) and said second input terminal of said pulse amplifier to the positive voltage supply line (L2) of a current supply system utilized by said radio receiver.

3. Circuit as defined in claim 2, in which said impedance (Z) is an interposed circuit component having a d.c. resistance sufficiently small so that the operating supply voltage of said receiver will not be reduced by substantially more than one volt.

4. Circuit as defined in claim 3, in which said interposed circuit component is a resistor.

5. Circuit as defined in claim 4, in which said interposed circuit component is composed of a resistor shunted by a radio frequency choke.

* * * * *